United States Patent Office 3,509,727
Patented May 5, 1970

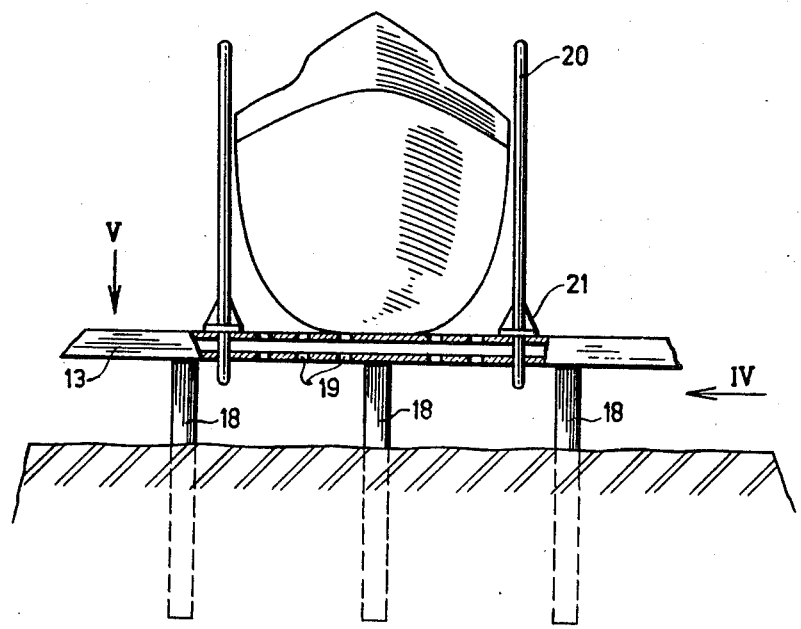
FIG. 3.
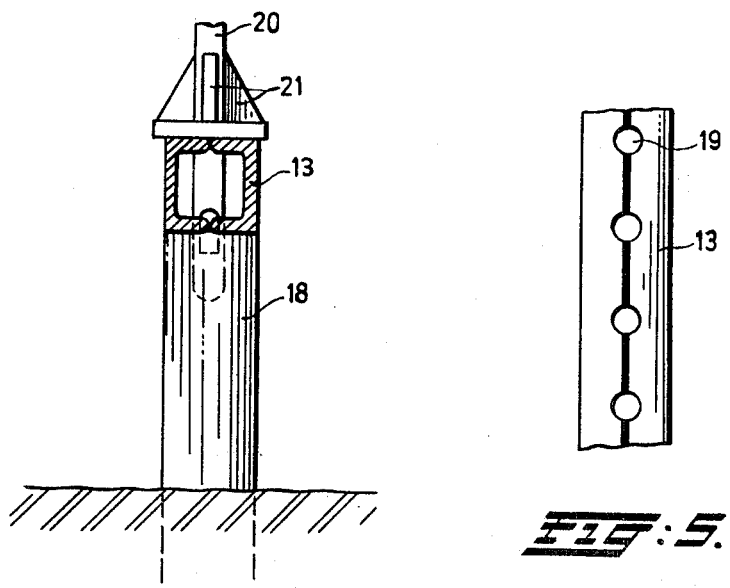
FIG. 4.
FIG. 5.

3,509,727
INSTALLATION FOR DRY-STORING OF WATERCRAFT
Johan H. Zorab, Boornzwaag, and Jan J. Keulen, Langweer, Netherlands, assignors to Recreatiecentrum de Woudfennen N.V., Langweer, Netherlands
Filed Oct. 1, 1968, Ser. No. 764,204
Claims priority, application Netherlands, Oct. 6, 1967, 6713598
Int. Cl. B63c 1/00
U.S. Cl. 61—64          3 Claims

ABSTRACT OF THE DISCLOSURE

Installation for dry-storing of a large number of watercraft during the period that the atmospheric conditions or other reasons such as the climate renders it unpleasant to use the craft. To this end the installation comprises:

- a basin with one or more narrow passages to an adjacent fairway or lake;
- a movable closure means for each passage;
- a pump for lowering the water level in the basin and for maintaining this low level;
- supporting beams for the craft, near the bottom of the basin;
- a covering of the basin when climatic conditions renders this desirable.

---

The invention relates to a problem which to an increasing extent is encountered owing to the presence of watercraft on inland waterways of those countries where water sport is practised.

This problem is especially oppressive for the so called "wintering" of watercraft which are used for pleasure and therefore principally sail during the summer months.

In order to conserve and maintain a craft which is only used during a limited period of the year, it is of importance that in the period in which the craft "winters," the craft is brought to land. In this way the corrosive effect of the water on the hull of the craft is prevented for the period of standstill, while further a possibility is created to maintain and, if need be, repair the lower (normally immersed) side of the hull.

So far people were accustomed to bring the craft to land by means of a crane on the shore. A drawback of this way of storing for wintering is, that in the first place a slipway or a crane should be available, while in the second place the operation itself requires much labour and is therefore expensive. Apart from these disadvantages another drawback has appeared during the last few years viz. the shortage of shore space as a consequence of the increase of the number and dimensions of watercraft.

The invention relates to the problem disclosed hereinbefore and it is an object of the invention to provide a device for keeping a large number of watercraft on dry land during a part of the year. This object is attained according to the invention by a combination of:

a basin which is at least partly covered and which by way of at least one narrow passage is connected with a fairway,
a removable closure for each passage, and
a pump for lowering and maintaining the water level in the basin to under the level of the bottom of the lowest situated craft.

Due to these features a compact wintering storage space for a large number of watercraft is obtained within a spatially very limited compass, the craft being kept free from the action of the water and of the weather for a lapse of time, e.g. 6 to 8 months, whilst occupying a very reduced length of the shore and only a very limited man-power being involved. The craft sail or are drawn from the fairway into the basin and are moored beside one another. Thereupon the closure for the passage is disposed between the fairway and the basin, after which the basin can be pumped out. When the new sailing season arrives, the water can again be admitted to the basin whereupon the closure is removed and the craft can return to the fairway via the passage.

It should be noted that a winter storage for small watercraft is known consisting of a shed disposed over a branch of a fairway. Under this shed either a slipway or a number of racks are provided on which the craft can be placed in order to be kept dry. Here applies the same drawback of the amount of man power required for this manner of storage which is only applicable for row boats and small sailing boats.

It should be further noted that for watercraft repairs a stationary dry dock is commonly known. Such a dock is however mostly suitable for only one for a few ships. Furthermore the passage to the fairway is mostly as large as the dock itself. Finally such a dock is not provided with any covering.

According to an embodiment of the invention the basin consists breadthwise of three juxtaposed areas the two outer areas of which are each provided with two lengthwise extending parallel horizontal supporting beams at about 1½ to 2 meters under the normal water level, the central area being provided with a number of short supporting beams extending transversally. This construction is advantageous in that the bottom and the keel of each watercraft will become easily accessible, so that cleaning, washing down, painting, repairing etc. can be conveniently carried out.

In the process of pumping out the basin, the water level falls progressively and the bottom of each craft descends in the direction of the supporting beams. Under these circumstances it is favourable when at the time whereat the bottom of the craft contacts the supporting beams it becomes possible to check personally the correct situation of each craft. This inspection is facilitated according to the invention when the height of the supporting beams above the bottom of the basin lies in the order of magnitude of 1 meter and when this level in the one outer area is situated higher than that of the supporting beams in the other outer area. In this way at first the craft of the one area and only then the craft from the other area contact the supporting beams.

In order to support laterally the juxtaposed craft a plurality of equidistantly spaced holes are provided in the supporting beams while a number of supporting poles are placed in an upright position into said holes. In this manner it is possible to position the lateral supporting poles in conformity with the width of each of the craft to be supported.

Other objects and advantages of the present invention will be apparent upon reference to the accompanying description when taken in conjunction with the following drawings showing an installation adapted for a country with a poor climate:

FIG. 3 is a section according to the line III—III in FIG. 2 to a still larger scale;

FIG. 4 is a side elevation and sectional view according to the arrow IV in FIG. 3;

FIG. 5 is a plan view according to the arrow V in FIG. 3.

Figure 1:
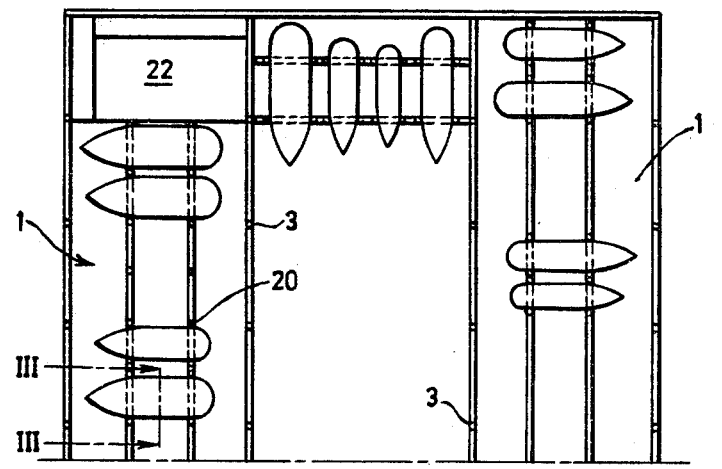
FIG. 1 is a vertical section through the installation perpendicular to the longitudinal center line of the basin.
Figure 2:
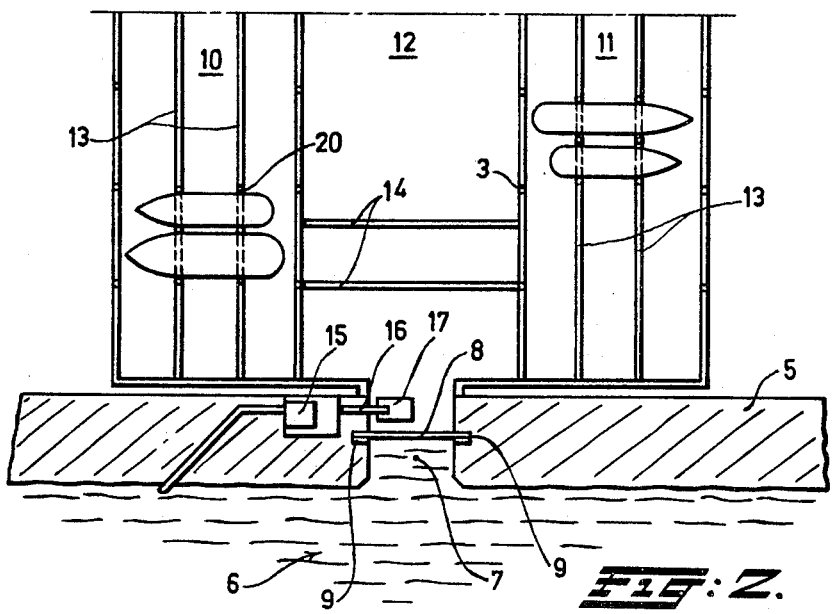
FIG. 2 is a plan view to a larger scale of the installation in which for the sake of clearness the covering is removed.

As is to be seen in FIGS. 1 and 2 the installation consists of a basin 1 provided with a covering 2 bearing on a number of columns 3. The basin 1 in the depicted embodiment is excavated in a field 4 situated behind a dike 5. This dike constitutes a boundary for a fairway or lake 6. The basin 1 communicates via a small passage 7 with the fairway 6. The passage 7 is provided with a removable closure 8 consisting of a door or analogous member which is vertically movable in a groove or runway 9 on either side of the passage 7. With the aid of a lifting device (not shown) the closure 8 can be lifted from the groove 9 or be lowered therein.

The basin 1 consists breadthwise of three juxtaposed areas 10–12 the outer ones 10, 11 each being provided with two lengthwise extending parallel horizontal supporting beams 13. These beams are situated about 1½ to 2 meters below the water level. The central area 12 is provided with a number of short supporting beams 14 extending transversally. FIG. 2 shows a pump 15 which communicates through a pipe 16 with a pit 17 in the passage 7. This pump 15 serves to lower or maintain the water level in the basin as far as under the level of the bottom of the lowest situated craft. In practice the basin 1 will be entirely pumped dry in order to render it easy accessible to the maintenance staff.

The supporting beams 13, 14 are bearing on short columns 18 in such a way that the upper surface of the beams is situated about 1 meter above the bottom of the basin 1 (see FIGS. 3 and 4). The beams 13, 14 are composed of two symmetrically arranged beams of substantially U section which are welded to one another. Equidistantly spaced recesses 19 are provided in the supporting beams 13, 14 (see FIG. 5), the spacing being e.g. 20 cm. Supporting poles 20 can cooperate with these holes 19 for bounding laterally the various juxtaposed craft. The arrangement is shown in FIG. 3. The supporting poles 20 are provided with a thickened portion 21, so that each pole 20 can be easily removed from the holes 19 and placed therein without the pole sinking too far in the hole.

The embodiment represented in FIG. 2 can be dimensioned as follows: length 100 meters, width of the areas 10, 11 is 16 meters, whereas the width of the central area 12 is 20 meters. The columns 3 bearing the covering 3 are spaced 8 meters from one another. In a corner of the basin 1 a small work shop 22 may be arranged.

In summer there will be, in general, no watercraft moored in the basin 1 and the basin is in open communication with the fairway 6 via the passage 7. At the time whereat the craft should be prepared for wintering, they are successively piloted inwardly through the passage 7 and disposed in the areas 10 and 11 in between the columns 3 in a manner as indicated for some craft in FIG. 2. When the areas 10 and 11 are entirely occupied the central section 12 can be gradually filled. Only some supporting beams 14 are depicted in FIG. 2 but it is evident that they extend on the entire length of the area 12. When the basin 1 is completely filled with watercraft the closure 8 is mounted in the passage 7 and a pumping installation e.g. the pump 15 is actuated in order to empty the basin. It might take some days e.g. five days to pump the basin dry. Since this operation need only be carried out once a year, it is possible to rent a pumping installation for this purpose so that no permanent pump need be installed. The pump denoted by 15 will keep the basin dry when all the water has been discharged to the fairway 6.

When the water level in the basin 1 falls, the craft come gradually to bear on the supporting beams 13, 14. Due to a small difference in height of these beams in the various areas 10–12, the craft from the one area will bear sooner on their supporting beams than the craft in the other areas. When the water level is falling, the supporting poles 20 can be inserted in the holes 19 in order to prevent the craft from tilting sideways when the level is falling further.

The invention provides a dry and covered wintering accommodation for a large number of watercraft, whilst only a small labour force is required. During the wintering period it becomes possible to check, clean and repair the hulls of all the craft by the aid of only a few persons.

It is observed that the above described embodiment of the installation according to the invention, is adapted to the conditions of the climate in the northern part of Europe. In those countries where a milder climate prevails, it might be possible to omit partly or completely the covering of the basin.

For entering and leaving the basin, one single passage could be sufficient. However, it might be advantageous to provide different passages. This renders it possible to speed up the entering or leaving of the craft. A further advantage of a plurality of passages between the basin and the fairway is, that it becomes possible to use the installation during the sailing season for anchoring place during the night. A pollution of the water in the basin is avoided by generating a flow of water from one passage to another.

It will be understood that this invention is subject to modification in order to adapt it to different uses and widely varying conditions of atmosphere and climate. Accordingly it is desired to comprehend such modifications within this invention.

What is claimed is:

1. Installation for dry-storing of a large number of watercraft, characterized by:
   a basin which is at least partly covered and which by way of at least one narrow passage is connected with a fairway; said basin consisting breadthwise of three juxtaposed areas, the two outer areas of which are each provided with two lengthwise extending parallel horizontal supporting beams at about 1½ to 2 meters under the normal water level, the central area being provided with a number of short supporting beams extending transversely;
   a removable closure for each passage;
   a pump for lowering and maintaining the water level in the basin to under the level of the bottom of the lowest situated craft.

2. Installation according to claim 1, characterized in that the height of the supporting beams above the bottom of the basin lies in the order of magnitude of 1 meter, this level in the one outer area being higher than that of the supporting beams in the other outer area.

3. Installation according to claim 1 or 2, characterized in that the supporting beams are provided with a plurality of equidistantly spaced holes, while a number of supporting poles are positionable in an upright position into said holes of the supporting beams.

References Cited

UNITED STATES PATENTS

| | | | |
|---|---|---|---|
| 721,223 | 2/1903 | O'Rourke | 61—64 |
| 1,376,345 | 4/1921 | Lawton | 61—64 |
| 2,708,346 | 5/1955 | Smith | 61—65 |
| 2,995,015 | 8/1961 | Phelps | 61—64 |
| 3,124,935 | 3/1964 | Foster | 61—64 |

J. KARL BELL, Primary Examiner